United States Patent [19]
Esmond

[11] 3,795,088
[45] Mar. 5, 1974

[54] DEGASSING PARTICULATE MATTER AND OIL FILTER DEVICE

[76] Inventor: William G. Esmond, 537 Stamford Rd., Baltimore, Md. 21229

[22] Filed: Mar. 3, 1972

[21] Appl. No.: 231,691

[52] U.S. Cl.............. 55/206, 210/336, 210/436, 210/DIG. 23
[51] Int. Cl............................................ B01d 19/00
[58] Field of Search......... 55/52, 90, 178, 206, 233; 210/436, 446; 261/94, 95

[56] References Cited
UNITED STATES PATENTS

| | | | |
|---|---|---|---|
| 3,701,433 | 10/1972 | Krakauer et al. | 210/436 |
| 3,127,255 | 3/1964 | Winslow | 210/304 X |
| 2,834,466 | 5/1958 | Hament | 261/95 X |
| 3,491,882 | 1/1970 | Elam | 210/266 X |
| 2,949,934 | 8/1960 | Schrenk | 261/95 X |
| 3,227,429 | 1/1966 | Renzi | 55/233 X |

Primary Examiner—Samih N. Zaharna
Assistant Examiner—Richard W. Burks
Attorney, Agent, or Firm—Chas. R. Allen

[57] ABSTRACT

This disclosure relates to a device for the removal of gases, particulate matter and oil from a liquid, and more particularly for the removal of bubbles from blood after the treatment thereof in an artificial body device such as an artificial kidney or artificial lung. The device operates primarily on the principle of laminar flow of the blood through and material having an affinity for the liquid or blood whereby gases or bubbles entrapped therein will be caused to be released. The flow is one wherein the liquid, such as blood, will in no way be damaged.

9 Claims, 6 Drawing Figures

PATENTED MAR 5 1974 3,795,088
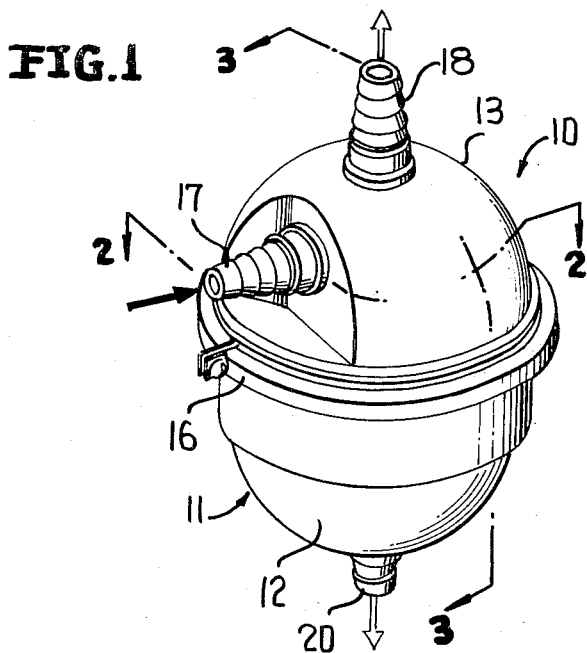
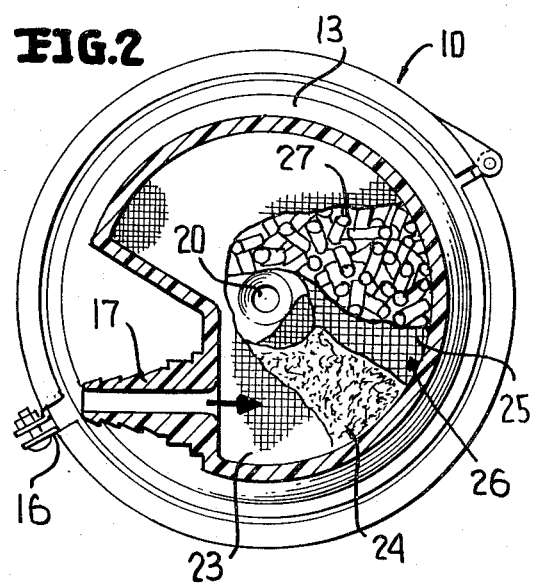
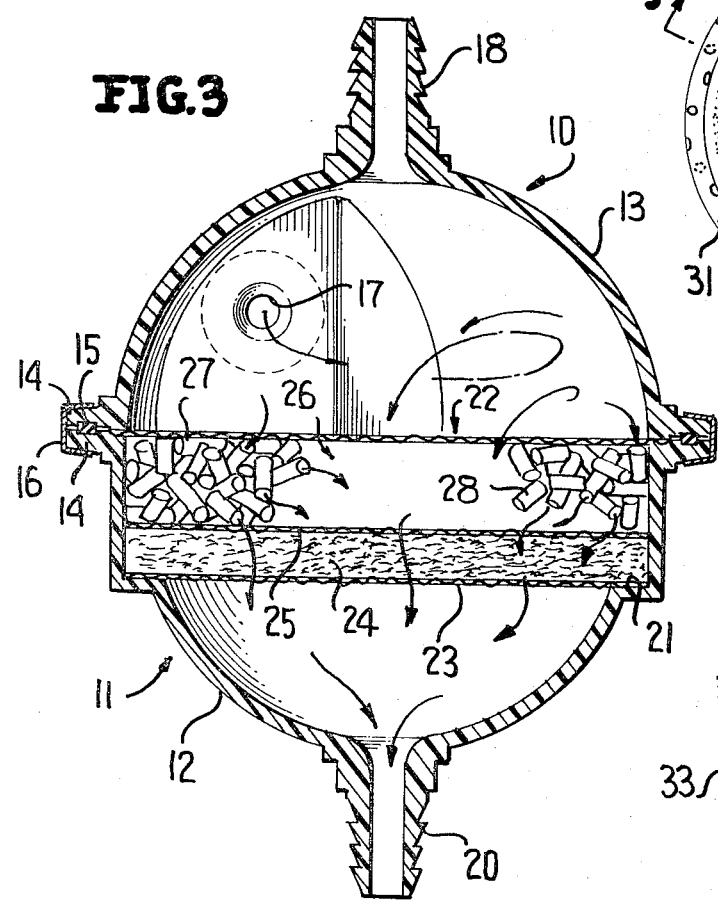
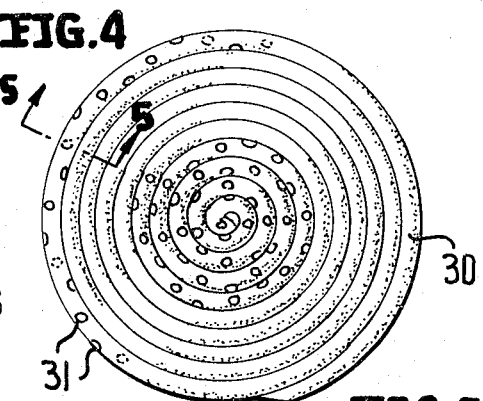
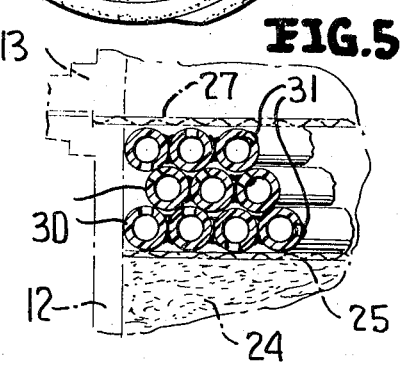
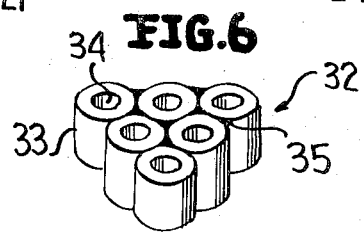

DEGASSING PARTICULATE MATTER AND OIL FILTER DEVICE

This invention relates in general to new and useful improvements in degassing and filtering devices, and more particularly to a device for use in treating human blood.

BACKGROUND OF THE INVENTION

In the treatment of human blood by the passage thereof through artifical body members, such as an artificial lung, there is a tendency for bubbles of air and oxygen to exist within the blood. Also, particulate matter, such as platelat clumps, white cells and fibrinous debris occur in the blood together with organic oil droplets as may be formed from the lipide components of blood itself or from silicon oil droplets that originate from the use of bubble oxygenators which must employ silicone oil defoaming agents which are swept into the blood.

SUMMARY OF THE INVENTION

In view of the foregoing, it is proposed to provide a device through which human blood, after being treated, is passed with the flow through the device being sufficiently gentle so as to in no way harm the blood, but at the same time being one wherein gas, particulate matter and oil which may possibly exist in the blood are removed.

A primary feature of the invention is the provision of a vortex-screen gas removal means within a housing. The housing also contains a mesh of fine monofilament fibers to filter out solute particles in the blood and an oil filter in the form of tubing defining a tortuous path for the blood flow through the tubing. The tubing serves as an impingement oil filter.

Another feature of the invention is the formation of tortuous pathways of tubing or absorbants of various compositions such as silicon rubber or Latex rubber which have particular affinity for various composition oil droplets in blood.

It has been found that the tubing may be disposed in the path of flowing blood in many ways and still be effective. For example, it may be in the form of merely cut up short lengths which are random disposed in the path of blood. The tubing is also found to be effective if the tubing is arranged in short lengths with the axes of the lengths of tubing being disposed substantially in alignment with the direction of blood flow. Also, it has been found that if the tubing is arranged in coiled and stacked relation and the tubing is perforated at intervals so that flow is repeatedly into, through and out of the tubing, this provides for an impingement type oil droplet filter.

It has also been found that a filter in combination with the tubing has been effective.

Finally, it is noted that while the apparatus is most effective for the removal of gases and bubbles from blood, it may be utilized in conjunction with other liquids for a similar gas or bubble removal.

With the above and other objects in view that will hereinafter appear, the nature of the invention will be more clearly understood by reference to the following detailed description, the appended claims and the several views illustrated in the accompanying drawing:

IN THE DRAWING:

FIG. 1 is a perspective view of the device and shows the general details thereof.

FIG. 2 is a top plan view of the device of FIG. 1 with the upper portion thereof broken away along the line 2—2 and shows further details thereof.

FIG. 3 is a vertical sectional view on a large scale taken generally along the line 3—3 of FIG. 1 and shows the internal construction of the device.

FIG. 4 is a plan view of another form of tubing arrangement.

FIG. 5 is an enlarged fragmentary sectional view taken along the line 5—5 of FIG. 4 and shows more details of the tubing arrangement of FIG. 4.

FIG. 6 is a fragmentary perspective view of still another tubing arrangement.

Referring now to the drawing in detail, it will be seen that the device is generally identified by the numeral 10 and includes a housing generally identified by the numeral 11. While the housing 11 may vary in construction in accordance with this invention, the housing 11 basically includes a lower housing half 12 and an upper housing half 13 which are readily separable but are sealed together against leakage therebetween. For example, the housing halves 12 and 13 may be provided with cooperating flanges 14 having a suitable sealing member 15 therebetween and being clamped together by means of a suitable clamping ring 16.

The upper housing half 13 is provided with a supply fitting 17 which is generally disposed at an angle to the vertical axis of the housing 11 and is offset therefrom so as to provide generally for spiral flow, as is clearly shown in FIG. 2.

The upper housing half 13 is also provided with a vent fitting 18 at the extreme upper end thereof. The vent fitting 18, by being disposed at the uppermost position of the housing 11, will provide a maximum path for removed gases or bubbles so as to minimize the outflow of liquid therewith, but at the same time will assure the proper venting of the housing 11 during a degassing operation.

The housing 11 further includes a drain fitting 20 which is at the extreme bottom of the bottom half 12 thereof. The drain fitting 20, as is clearly shown in FIG. 3, is in a position to immediately drain liquid treated within the device 10 so that the flow of liquid through the device 10 may be continuous without storage therein.

Referring once again to FIG. 3, it will be seen that the bottom housing half 12 is configurated so as to define an upwardly facing annular shoulder 21 in the upper part thereof. Seated on the shoulder 21 are gas and oil removal means, generally identified by the numeral 22.

The gas removal means 22 includes a lower support screen 23, a filter medium 24 and an upper support screen 25. When the device 10 is utilized in the treatment of blood, it has been found that the screens 23 and 25 may be effectively formed of a 24 mesh stainless steel screen. Of course, the invention is not so limited. In a like manner, the filter material 24 has been found to have beneficial effects when it is formed of dacron or polyester monofilaments.

Above the screen 25, the oil removal means 22 includes a tubing arrangement, generally identified by the numeral 26 and discussed in more detail hereinafter. Above the tubing arrangement 26, the gas removal means 22 includes an upper screen 27 which is clamped between the two flanges 14 of the housing halves. This upper screen may be effectively formed of 100 mesh nylon screen.

The tubing arrangement 26 may vary and in its simplest form, the tubing arrangement 26 is formed of short lengths of tubing 28 which are packed at random between the screens 25 and 27. The tubing is preferably in the form of silicon tubing having an internal diameter on the order of 3/16 inch. It will be readily apparent that blood or other liquids being treated must have a random path of flow through the tubing lengths 28 and that when blood is being treated, its affinity for silicon will effect a laminar flow which greatly increases the tendency of the blood to impinge on and trap oil therefrom. It is to be understood that the flow will be both through and around the short lengths of tubing.

In FIGS. 4 and 5 there is illustrated another tubing arrangement. Here the tubing is not cut up, but is arranged in coiled and stacked relation. The tubing 30, in its coiled form, is perforated, primarily in its upper and lower surfaces, at spaced offset intervals, as at 31. As the liquid being treated flows onto the coiled and stacked tubing 30, it must pass into the tubing through the perforations 31. Further, it must flow through the tubing a short distance before it reaches a lower perforation. It will then flow out through the tubing onto the next layer thereof where it will again enter the tubing through a perforation, flow through the tubing a short distance and out through a bottom perforation. This process continues until it reaches the bottom of the stacked tubing. It will be readily apparent that this tubing arrangement provides for maximum contact of the liquid being treated with the tubing and therefore, for maximum oil droplet removal. When the liquid being treated is blood, once again the tubing is preferably formed of a silicon rubber material because of its affinity for silicon oil droplets.

It is also to be noted at this time that it is feasible to form the tubing of Latex rubber. Further, coated charcoal particles may be employed in this layer to absorb various noxious chemical moieties in the blood.

Finally, there is shown in FIG. 6 another tubing arrangement generally identified by the numeral 32. In this arrangement the tubing is cut in short lengths 33 similar to the short lengths 28. However, the short lengths of tubing 33 are all of the same length and are disposed in side-by-side relation with the bore 34 of each length of tubing 33 extending substantially parallel to the direction of liquid flow through the device 10. If desired, the short lengths of tubing 33 may be readily stacked on the screen 25. However, for ease of handling, it is preferable that the short lengths of tubing be bonded together by a suitable bonding material 35 so that the tubing assembly 32 may be handled as a unit. Of course, if the liquid being treated is blood, the short lengths of tubing 33 will be cut from silicon tubing.

In addition to the advantageous arrangement for the removal of gases and bubbles from liquids, particularly blood, it is to be noted that the device is of a construction wherein it may be readily sterilized and a majority of the components thereof may be reused. It will be readily apparent that with the exception of the filter material 24, all of the other elements of the gas removal means 22 may be cleansed and sterilized, where necessary, and then reused. The same, of course, is true of the housing 11.

Although only several preferred embodiments of the device have been specifically illustrated and described herein, it is to be understood that minor modifications may be made therein without departing from the spirit and scope of the invention, as defined by the appended claims.

I claim:

1. A device for removing gases, particulate matter and oil from blood, said device comprising a housing, a drain means in a lower portion of said housing, a supply means in an upper portion of said housing, and continuous operable vent means at an upper end portion of said housing, and said housing containing means intermediate said supply means and said exhaust means for removing gases and oil from liquids flowing between said supply means and said means, said gas removal means including tubing defining a tortuous path for liquid flowing between said supply means and said drain means.

2. The device of claim 1 wherein said tubing is a silicone rubber tubing.

3. The device of claim 1 wherein said tubing is in the form of short sections.

4. The device of claim 1 wherein said tubing is in the form of short sections disposed in random relation.

5. The device of claim 1 wherein said tubing is in the form of short sections disposed in side-by-side relation and interconnected.

6. The device of claim 1 wherein said tubing is disposed in coiled and stacked relation, and said tubing is perforated at spaced intervals whereby liquid repeatedly runs into, through and out of said tubing in the flow thereof between said supply means and said drain means.

7. The device of claim 1 wherein filter means are disposed below said tubing.

8. The device of claim 1 wherein filter means are disposed below said tubing, said housing having support means supporting said filter above said drain means, and said filter means forming tubing support means.

9. The device of claim 8 wherein a retainer for said tubing extends above said tubing, and said housing is formed in sections with said retainer being releasably clamped between said housing sections.

* * * * *